United States Patent [19]
Ota

[11] Patent Number: 5,710,654
[45] Date of Patent: Jan. 20, 1998

[54] SCANNING LENS AND AN OPTICAL SCANNER USING THE SAME

[75] Inventor: Akira Ota, Iwatsuki, Japan

[73] Assignee: Fuji Xerox Co., Ltd., Tokyo, Japan

[21] Appl. No.: 585,564

[22] Filed: Jan. 16, 1996

[30] Foreign Application Priority Data

Jan. 12, 1995 [JP] Japan .................................. 7-003492

[51] Int. Cl.$^6$ .................................................. G02B 26/08
[52] U.S. Cl. ........................... 359/205; 359/206; 359/216; 359/217; 359/662; 359/718
[58] Field of Search .................................. 359/205–207, 359/216–219, 662, 708, 711–718; 347/258–267

[56] References Cited

U.S. PATENT DOCUMENTS

| | | |
|---|---|---|
| 5,128,795 | 7/1992 | Endou et al. .................. 359/207 |
| 5,162,938 | 11/1992 | Iima et al. ..................... 359/207 |
| 5,329,399 | 7/1994 | Ho ................................. 359/206 |

FOREIGN PATENT DOCUMENTS

| | | |
|---|---|---|
| 57-144518 | 9/1982 | Japan . |
| 62-138823 | 6/1987 | Japan . |
| 63-50812 | 3/1988 | Japan . |
| 3-55513 | 3/1991 | Japan . |
| 4-50908 | 2/1992 | Japan . |
| 5-45580 | 2/1993 | Japan . |

*Primary Examiner*—James Phan
*Attorney, Agent, or Firm*—Finnegan, Henderson, Farabow, Garrett & Dunner, L.L.P.

[57] ABSTRACT

Improved optical scanner comprises semiconductor laser 10, aperture 12, collimator 14, cylindrical lens 16, polygonal mirror 18 and single-element fθ lens 22 which is formed of an amorphous polyolefin as a plastic material. Surface S1 of fθ lens 22 which is on the side adjacent polygonal mirror 18 is aspheric and asymmetrical with respect to an axis of rotation, and opposite surface S2 on the side adjacent photoreceptor drum 26 is also aspheric but symmetrical with respect to an axis of rotation. Lens surface S1 is an anamorphic aspheric surface which is convex toward polygonal mirror 18 in the deflecting plane due to the positivity of the paraaxial radius of curvature R1M but which is concave toward the polygonal mirror 18 in the plane orthogonal to the deflecting plane due to the negativity of the paraaxial radius of curvature R1S. Lens surface S2 is aspheric and convex toward the photoreceptor drum in the deflecting plane but circular and convex toward the photoreceptor drum in the plane orthogonal to the deflecting plane. The fθ lens 22 is a scanning lens that has high performance and which yet is easy to design and manufacture.

5 Claims, 13 Drawing Sheets

CURVATURE OF FIELD fθ CHARACTERISTICS

CURVATURE OF FIELD fθ CHARACTERISTICS

CURVATURE OF FIELD fθ CHARACTERISTICS

CURVATURE OF FIELD fθ CHARACTERISTICS

CURVATURE OF FIELD fθ CHARACTERISTICS

CURVATURE OF FIELD fθ CHARACTERISTICS

CURVATURE OF FIELD fθ CHARACTERISTICS

CURVATURE OF FIELD fθ CHARACTERISTICS

SCANNING LENS AND AN OPTICAL SCANNER USING THE SAME

BACKGROUND OF THE INVENTION

This invention relates to a scanning lens and an optical scanner using the same. More particularly, the invention relates to a single-element scanning lens suitable for use as an fθ lens in laser scanning optics, as well as an optical scanner equipped with the lens.

Optical scanners are extensively used on optical printers as well as digital and other types of copiers. Two major components of an optical scanner are a deflector such as a polygonal mirror that deflects a beam of incident light at uniform angular velocity in a direction parallel to the main scanning direction and an fθ lens working as a scanning lens. The fθ lens serves two purposes: first, a laser beam deflected with the deflector after issuing typically from a semiconductor laser is focused as a light spot on a surface to be scanned such as a photoreceptor drum or belt; second, the light spot is moved at generally uniform speed on the surface to be scanned.

The fθ lens is often provided with such a capability that the position of a deflection point on the deflector and the position of the light spot on the surface to be scanned satisfy a conjugative relationship in a plane orthogonal to the plane formed by the deflected laser beam; working in combination with a cylindrical lens that is located adjacent the deflector on the side where the laser beam is incident and which has a lens power in a direction parallel to the sub-scanning direction, the fθ lens provides tilt correcting optics that optically corrects the tilting of reflecting faces of the deflector and which shapes the light spot to a generally circular cross section.

Most commercial fθ lenses are composed of two or more elements but the resulting optics are complex in composition. To deal with this difficulty, single-element fθ lenses have been proposed as simple optics.

Unexamined Published Japanese Patent Application (kokai) Sho 57-144518, Sho 63-50812 and Hei 3-55513 disclose single-element fθ lenses, one surface of which is toric while the other surface is spherical, cylindrical or toric. Unexamined Published Japanese Patent Application (kokai) Sho 62-138823, Hei 4-50908 and 5-45580 disclose fθ lenses having an aspheric surface.

The fθ lens disclosed in Unexamined Published Japanese Patent Application (kokai) Sho 57-144518, supra, is solely composed of toric surfaces and its performance in the main scanning cross section is only comparable to that of a single spherical lens element; hence, it has a smaller latitude in design, is limited in the ability to insure good imaging performance in terms of fθ characteristic and curvature of the field, and hence is incapable of providing high resolution. If one dares to insure good imaging performance, the center thickness of the lens must be increased as noted in Unexamined Published Japanese Patent Application (kokai) Sho 63-50812 and Hei 3-55513, supra, and difficulty is encountered in manufacture, which increases the production cost.

With a view to solving these problems, Unexamined Published Japanese Patent Application (kokai) Sho 62-138823 and Hei 4-50908, supra, have proposed fθ lenses that are provided with an aspheric surface to assure better imaging performance. However, the geometry of that surface is so complex that its curvature cannot be expressed by a single formula and considerable difficulty is involved in lens design and manufacture. A further problem with the fθ lens disclosed in Unexamined Published Japanese Patent Application (kokai) Sho 62-138823, supra, is that wavefront aberrations are not considered in design and that therefore it is not suitable for achieving high resolution. The fθ lens disclosed in Unexamined Published Japanese Patent Application (Kokai) Hei 4-50908, supra, requires convergent, rather than generally parallel light, as an incident beam and to meet this requirement, the deflector must have high precision in shape. Speaking of the fθ lens disclosed in Unexamined Published Japanese Patent Application (kokai) Hei 5-45580, supra, the shape of a cross section taken in the main scanning direction has a meniscus that is convex toward the surface to be scanned and an aspheric surface having an axis of rotation is employed. However, condensing optics must be located adjacent a dovetail mirror (deflector) on the side where incident light is launched; in addition, the fθ characteristics of the lens are by no means attainable at uniform speed but need electrical correction; hence, the overall system is complex and costly.

SUMMARY OF THE INVENTION

The present invention has been accomplished under these circumstances and has as an object providing a single-element scanning lens that has high performance and which yet is simple to design and manufacture.

Another object of the invention is to provide an optical scanner using said scanning lens.

The first object of the invention can be attained by a single-element scanning lens which is located between deflecting means for deflecting a beam of incident light in a specified direction at uniform angular velocity and a surface to be scanned and which allows the beam of incident light to be focused on the surface to be scanned such as to produce a light spot that scans at uniform speed, characterized in that said scanning lens comprises in order from the deflecting means side:

a first lens surface such that the geometry in a deflecting plane that is formed by the principal rays of the light beam deflected by said deflecting means is aspheric and paraaxially convex toward the deflector and that the geometry in a plane orthogonal to said deflecting plane and including the optical axis is aspheric and paraaxially concave toward the deflector; and a second lens surface that has an axis of rotation located in said deflecting plane and orthogonal to the optical axis of the scanning lens and which is such that curves formed by intersection with said deflecting plane provide an aspheric shape that is paraaxially convex toward the surface to be scanned whereas curves formed by intersection with the plane orthogonal to said deflecting plane provide a circular shape that is convex toward the surface to be scanned, further characterized in that said first and second lens surfaces satisfy the following relationships:

$0.598 < R1M/f < 1.475$ $-0.128 < R2S/f < -0.104$ where R1M is the paraaxial radius of curvature of said first lens surface in the deflecting plane, R1S is the paraaxial radius of curvature of said first lens surface in the plane orthogonal to the deflecting plane, R2M is the paraaxial radius of curvature of said second lens surface in the deflecting plane, R2S is the paraaxial radius of curvature of said second lens surface in the plane orthogonal to the deflecting plane, f is the focal length of the scanning lens in the deflecting plane, and the minus sign means that the lens surface of interest is convex on the side where the incident beam travels on rather than it is launched.

In a preferred embodiment, said first lens surface is such a curved surface that when a YZ plane having the origin at the point of intersection between the optical axis and the first lens surface, with the Z axis coinciding with the optical axis, is assumed in the deflecting plane and when the X axis is assumed in the plane orthogonal to the deflecting plane, position Z in a plane parallel to the optical axis is expressed by the following equation I, and said second lens surface is such that when a YZ plane having the origin at the point of intersection between the optical axis and the second lens surface, with the Z axis coinciding with the optical axis, is assumed in the deflecting plane, position Z in a plane parallel to the optical axis is obtained by causing a curve expressed by the following equation II to rotate about a line parallel to the Y axis and distant from the origin by R2S:

$$Z = \frac{(1/R1S)\, X^2 + (1/R1M)\, Y^2}{1 + Sqrt\{1 - (1+KX)\,(1/R1S)^2 X^2 - (1+KY)\,(1/R1M)^2 Y^2\}} +$$

$$AR\, \{(1-AP)\, X^2 + (1+AP)\, Y^2\}^2 + BR\, \{(1-BP)\, X^2 + (1+BP)\, Y^2\}^3 +$$

$$CR\, \{(1-CP)\, X^2 + (1+CP)\, Y^2\}^4 + DR\, \{(1-DP)\, X^2 + (1+DP)\, Y^2\}^5 \qquad \text{I.}$$

where KX is the conic constant of the asphere in the plane orthogonal to the deflecting plane and including the optical axis; KY is the conic constant of the asphere in the deflecting plane including the optical axis; AR, BR, CR, DR, AP, BP, CP and DP are higher-order aspheric coefficients; and $$Z = \frac{(1/R2M)\, Y^2}{1 + Sqrt\{1 - (1+K)\,(1/R2M)^2 Y^2\}} + AY^4 + BY^6 + CY^8 + DY^{10} \qquad \text{II.}$$

where K is the conic constant; and A, B, C and D are higher-order aspheric coefficients.

The second object of the invention can be attained by an optical scanner which comprises:

a light source;

collimating means for transforming a beam of the light from said source into a generally parallel beam;

imaging means by which said generally parallel beam is focused as a line image elongated in a direction parallel to the main scanning direction;

deflecting means that has a reflecting face at or near the focus position of said line image and which deflects the beam of incident light at uniform angular velocity in a direction parallel to the main scanning direction; and a single-element scanning lens located between said deflecting means and a surface to be scanned and characterized in that the lens surface adjacent said deflecting means is aspheric such that the geometry in a deflecting plane that is formed by the principal rays of the light beam deflected by said deflecting means is aspheric and paraaxially convex toward the deflector and that the geometry in a plane orthogonal to said deflecting plane and including the optical axis is aspheric and paraaxially concave toward the deflector and further characterized in that the lens surface adjacent said surface to be scanned has an axis of rotation located in said deflecting plane and orthogonal to the optical axis of the scanning lens and is such that curves formed by intersection with said deflecting plane provide an aspheric shape that is convex paraaxially toward the surface to be scanned whereas curves formed by intersection with the plane orthogonal to said deflecting plane provide a circular shape that is convex toward the surface to be scanned, and said scanning lens allowing the beam of incident light to be focused on the surface to be scanned such as to produce a light spot that scans at uniform speed.

The aspheric surfaces of the scanning lens may be as defined in the preferred embodiment described therein. If desired, the scanning lens may be so adapted as to satisfy the relationships:

0.598<R1M/f<1.475

−0.128<R2S/f<−0.104

The scanning lens according to the first aspect of the invention is composed of a single element and has two aspheric surfaces that are each expressed by a single equation but one of which is asymmetric with respect to an axis of rotation while the other is symmetric with an axis of rotation. The geometry of the scanning lens in the deflecting plane is such that it is formed of two non-arcuate aspheric curves, so the insufficiency in the imaging performance of a conventional scanning lens which is solely composed of spherical surfaces and which hence has limited latitude in design is compensated to achieve efficient correction of the fθ characteristic and the curvature of the field in the main scanning direction. In addition, the scanning lens is convex on both surfaces in the deflecting plane and this helps distribute the power of each lens surface so as to ensure against undue decrease in the radius of its curvature, whereby the center thickness of the lens is reduced while enabling it to be manufactured in a smaller size. With lens surfaces of a meniscus shape, small radii of curvature have to be employed in order to insure the desired focal length of the lens. Alternatively, the beam of incident light has to be transformed to convergent light thereby reducing the power that must be borne by the lens itself but then jitter will increase and very high precision is required by the deflector to avoid this problem.

The geometry of the scanning lens in the plane orthogonal to the deflecting plane is such that one cross section is composed of an aspheric curve whereas the other cross section is composed of an arcuate curve. If the absolute value of R1S which is the paraaxial radius of curvature of the first lens surface in the plane orthogonal to the deflecting plane is made greater than that of R2S which is the paraaxial radius of curvature of the second lens surface in the plane orthogonal to the deflecting plane, the curvature of the field can be reduced while assuring that the point of deflection satisfies a conjugative relationship with the surface to be scanned.

The relationship 0.598<R1M/f<1.475 specifies the condition chiefly for ensuring satisfactory performance in the main scanning direction. If the lower limit of this condition is not reached, the curvature of the field in the main scanning direction will increase and, in addition, the fθ characteristic will change in such a way as to produce a larger image and correction for providing negative distortion becomes difficult to achieve even if a higher-order aspheric surface is used. If the upper limit of the condition is exceeded, the fθ characteristic will change in such a way as to produce a smaller image and correction for providing positive distortion becomes difficult to achieve. What is more, the margin at the lens edges will decrease so that it becomes necessary to increase the center thickness of the lens, which is undesirable from the viewpoint of its manufacture.

The relationship −0.128<R2S/f<−0.104 specifies the condition that works conversely to the relationship discussed in the preceding paragraph. If the lower limit of this condition is not reached, the fθ characteristic will change in such a way as to produce a smaller image and correction for providing positive distortion becomes difficult to achieve. In addition, the margin at the lens edges will decrease so that it becomes necessary to increase the center thickness of the lens, which is undesirable from the viewpoint of its manufacture. If the upper limit of the condition is exceeded, the curvature of the field in the main scanning direction will increase and the fθ characteristic will change in such a way as to produce a larger image and correction for providing negative distortion becomes difficult even if a higher-order aspheric surface is used.

DETAILED DESCRIPTION OF THE INVENTION

Examples of the invention will now be described in detail with reference to the accompanying drawings.

Figure 4:
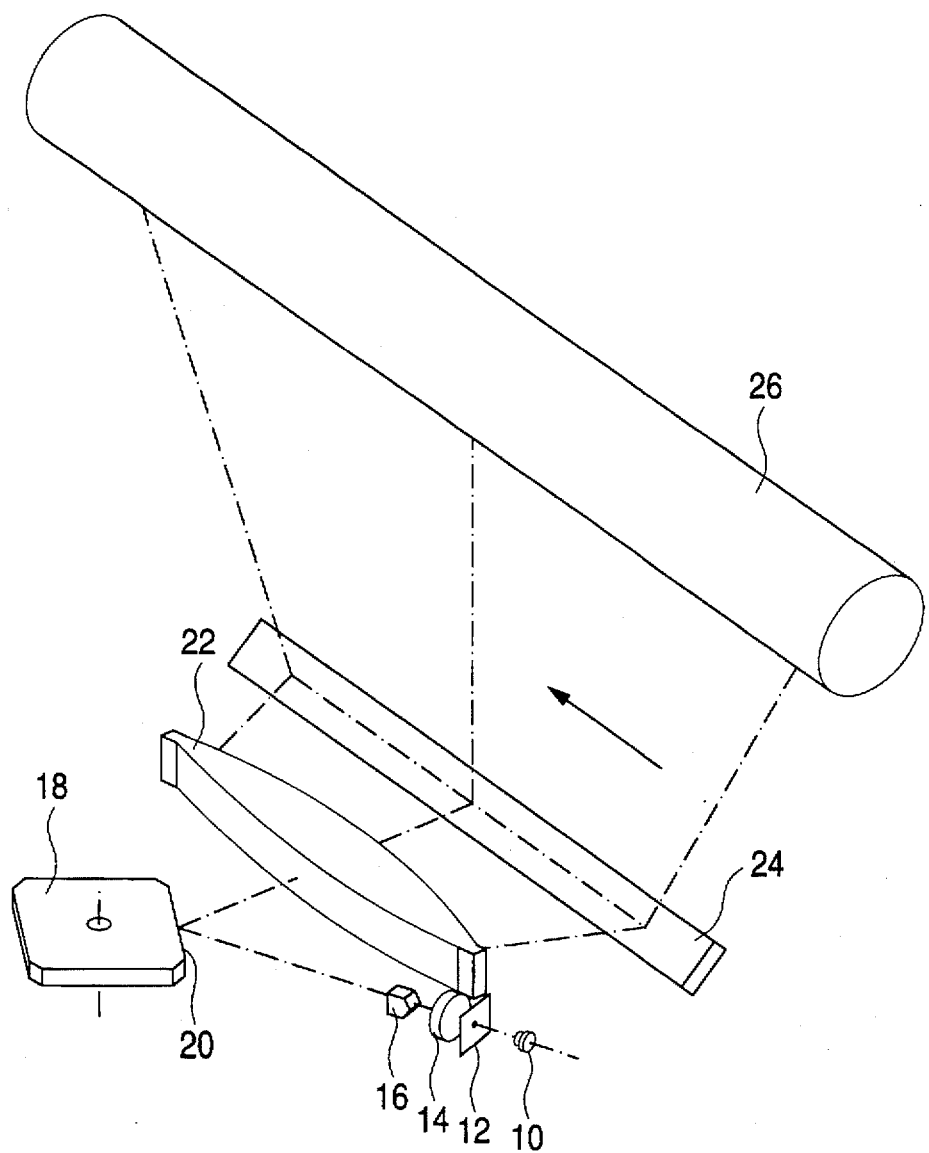
FIG. 4 is a perspective view of the optics of Example 1.
Figure 5A:
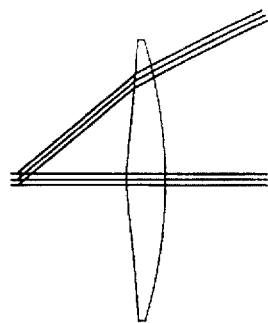
FIGS. 5(a)–5(h) are sectional views showing how the fθ lenses of Examples 1–8 look like in the deflecting plane.
Figure 5B:
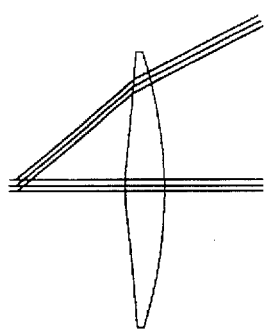
Figure 5C:
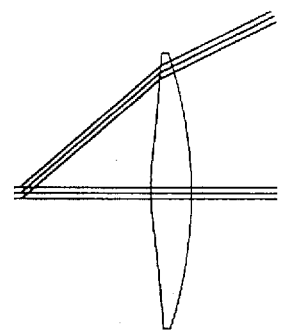
Figure 5D:
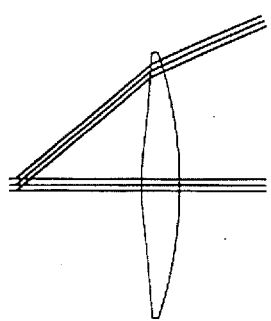
Figure 5E:
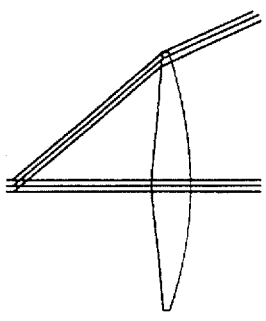
Figure 5F:
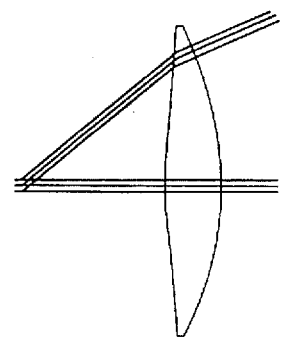
Figure 5G:
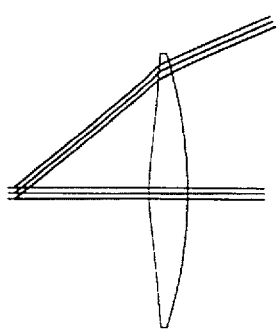
Figure 5H:
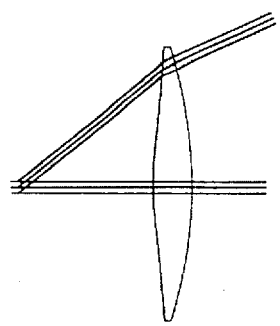

An optical scanner according to Example 1 of the invention is shown schematically in FIG. 4. A semiconductor laser 10 as a light source emits a laser beam which passes through an aperture 12 and a collimator 14 that shapes the beam to generally parallel light. The shaped laser beam passes through a cylindrical lens 16 that has a lens power in a direction parallel to the sub-scanning direction and which focuses said generally parallel light to form a line image elongated in a direction parallel to the main scanning direction indicated by the arrow. A polygonal mirror 18 is provided such that successive reflecting faces 20 are positioned at or near the focus position of the line image; the polygonal mirror 18 reflects the incident laser beam and deflects it at uniform angular velocity in a direction parallel to the main scanning direction. An fθ lens 22 is provided adjacent the polygonal mirror 18 on the side from which the laser beam is reflected; the fθ lens 22 is a single-element scanning lens formed of a plastic material (amorphous polyolefin) and by which a generally circular light spot is focused on a surface of a photoreceptor drum 26 such that it performs scanning at uniform speed. For mounting reasons, a reflector mirror 24 is provided between the fθ lens 22 and the photoreceptor drum 26 so that the laser beam issuing from the fθ lens 22 is reflected toward the photoreceptor drum 26.

According to Example 1, the laser beam emitted from the semiconductor laser 10 is focused by the cylindrical lens 16 to form a line image on the reflecting face 20 in a direction parallel to the main scanning direction; the cylindrical lens 16 is pre-polygonal optics which is located adjacent the polygonal mirror 18 on the side where the laser beam is incident. The focused laser beam is deflected by the polygonal mirror 18 at uniform angular velocity in a direction parallel to the main scanning direction and the deflected laser beam scan the surface of the photoreceptor drum 26 by the fθ lens 22 at uniform speed in the main scanning direction. The fθ lens 22 also has a tilt correcting action that corrects the unevenness in pitch in the sub-scanning direction. The beam spot on the surface of the photoreceptor drum 26 is made generally circular in cross section by the action of the cylindrical lens 16.

Figure 1:
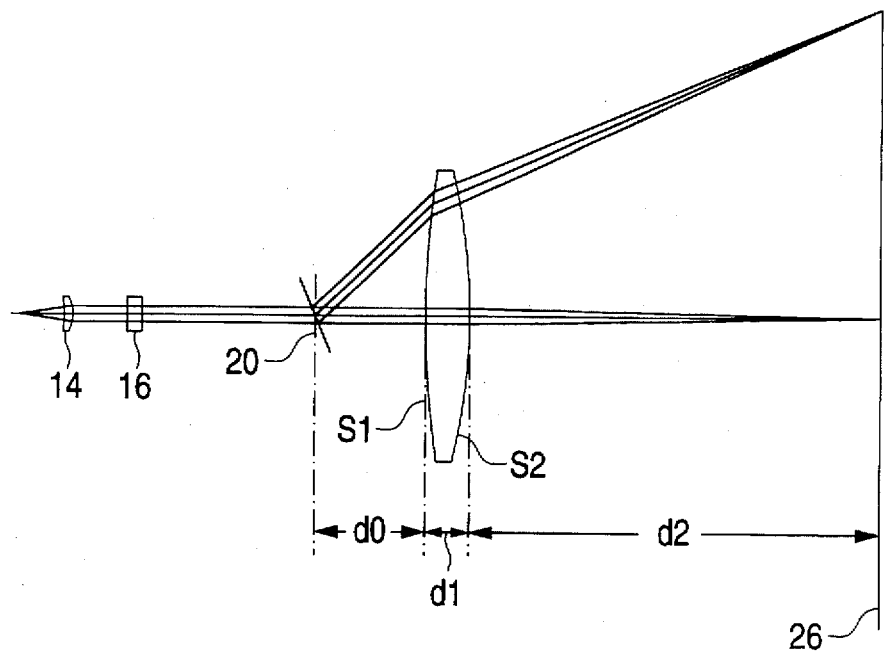
FIG. 1a is a sectional view showing the geometry of the fθ lens of Example 1 in the deflecting plane.
FIG. 1b is a sectional view showing the geometry of the fθ lens of Example 1 in the plane orthogonal to the deflecting plane.
Figure 1:
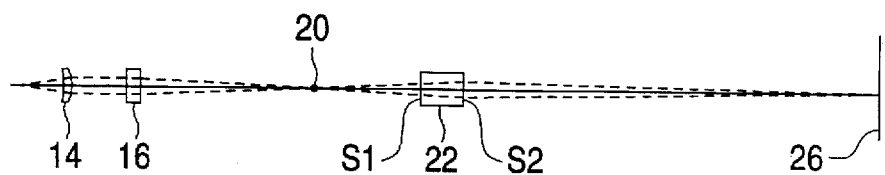

FIG. 1a shows the geometry of the fθ lens 22 in the deflecting plane (i.e., the plane formed by the principal rays of the laser beam deflected from the polygonal mirror 18), and FIG. 1b shows the geometry of the same lens in the plane orthogonal to the deflecting plane (which includes the optical axis of the lens and orthogonal to the deflecting plane). Surface S1 of the fθ lens 22 on the side adjacent the polygonal mirror 18, or the deflecting means, is formed of an asphere asymmetrical with respect to an axis of rotation; surface S2 of the fθ lens 22 on the side adjacent the photoreceptor drum 26, or the surface to be scanned, is formed of an asphere symmetrical with respect to an axis of rotation.

Figure 2:
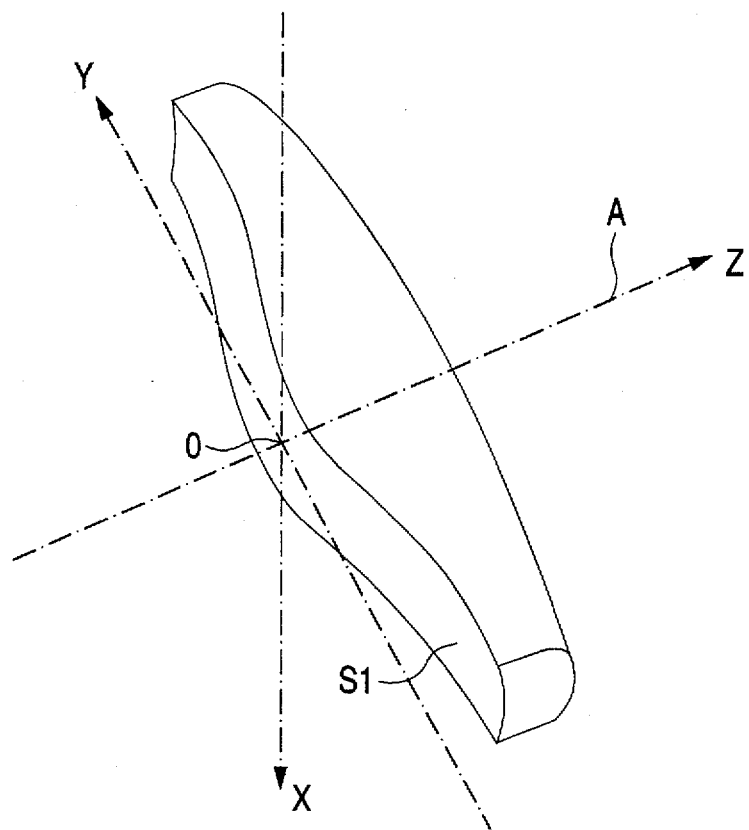
FIG. 2 illustrates how the fθ lens of Example 1 looks like on the surface adjacent the deflector.
Figure 2:
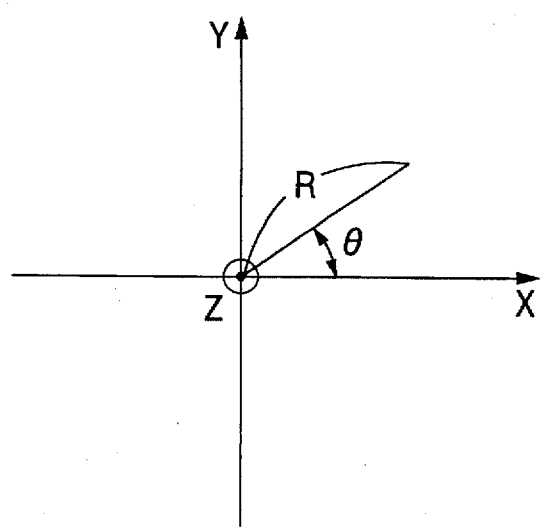

The aspheric lens surface S1 is such a curved surface that when a YZ plane having the origin O at the point of intersection between the optical axis A and the lens surface S1, with the Z axis coinciding with the optical axis, is assumed in the deflecting plane and when the X axis is assumed in the plane orthogonal to the deflecting plane as shown in FIG. 2a, position Z in a plane parallel to the optical axis is expressed by the following equation (1):

$$Z = \frac{(1/R1S) X^2 + (1/R1M) Y^2}{1 + Sqrt\{1 - (1+KX)(1/R1S)^2 X^2 - (1+KY)(1/R1M)^2 Y^2\}} + \quad (1)$$

$$AR \{(1-AP) X^2 + (1+AP) Y^2\}^2 + BR \{(1-BP) X^2 + (1+BP) Y^2\}^3 +$$

$$CR \{(1-CP) X^2 + (1+CP) Y^2\}^4 + DR \{(1-DP) X^2 + (1+DP) Y^2\}^5$$

where R1S is the paraaxial radius of curvature of the asphere in the plane orthogonal to the deflecting plane; R1M is the paraaxial radius of curvature of the asphere in the deflecting plane; KX is the conic constant of the asphericity in the plane orthogonal to the deflecting plane and including the optical axis; KY is the conic constant of the asphericity in the deflecting plane including the optical axis; AR, BR, CR, DR, AP, BP, CP and DP are higher-order aspheric coefficients.

Further speaking of surface S1, position Z in the deflecting plane, or the plane X=0, is expressed by the following equation (2):

$$Z = \frac{(1/R1M) Y^2}{1 + Sqrt\{1 - (1 + KY)(1/R1M)^2 Y^2\}} +$$
$$AR\{(1+AP)Y^2\}^2 + BR\{(1+BP)Y^2\}^3 +$$
$$CR\{(1+CP)Y^2\}^4 + DR\{(1+DP)Y^2\}^5$$

$$= \frac{(1/R1M) Y^2}{1 + Sqrt\{1 - (1 + KY)(1/R1M)^2 Y^2\}} +$$
$$AR(1+AP)^2 Y^4 + BR(1+BP)^3 Y^6 +$$
$$CR(1+CP)^4 Y^8 + DR(1+DP)^5 Y^{10}$$

Similarly, position Z in the plane orthogonal to the deflecting plane, or the plane where Y=0, is expressed by the following equation (3):

$$Z = \frac{(1/R1S) X^2}{1 + Sqrt\{1 - (1+KY)(1/R1S)^2 X^2\}} + \quad (3)$$
$$AR(1-AP)^2 X^4 + BR(1-BP)^3 X^6 + CR(1-CP)^4 X^8 + DR(1-DP)^5 Y^{10}$$

Each of equations (2) and (3) is a basic formula for expressing ordinary aspheres.

When looked at in the direction of the cross section shown in FIG. 2b, the geometry of lens surface S1 in the planes other than where X=0 and Y=0 can be expressed by the following equation (4) after transformation of the orthogonal coordinates to the cylindrical by making substitutions of X=Rcosθ, Y=Rsinθ and Z=Z;

$$Z = \frac{(1/R1S)(R\cos\theta)^2 + (1/R1M)(R\sin\theta)^2}{1 + Sqrt\{1 - (1 + KX)(1/R1S)^2 (R\cos\theta)^2 - (1+KY)(1/R1M)^2(R\sin\theta)^2\}} + \quad (4)$$
$$AR\{(1-AP)(R\cos\theta)^2 + (1+AP)(R\sin\theta)^2\}^2 +$$
$$BR\{(1-BP)(R\cos\theta)^2 + (1+BP)(R\sin\theta)^2\}^3 +$$
$$CR\{(1-CP)(R\cos\theta)^2 + (1+CP)(R\sin\theta)^2\}^4 +$$
$$DR\{(1-DP)(R\cos\theta)^2 + (1+DP)(R\sin\theta)^2\}^5$$

Rearranging eq. (4) by taking R out of parentheses, brackets and braces, we obtain the following equation (5):

$$Z = \frac{((1/R1S)\cos^2\theta + (1/R1M)\sin^2\theta)R^2}{1 + Sqrt\{1 - [(1 + KX)(1/R1S)^2\cos^2\theta + (1+KY)(1/R1M)^2\sin^2\theta]R^2\}} + \quad (5)$$
$$AR\{(1-AP)\cos^2\theta + (1+AP)\sin^2\theta\}^2 R^4 +$$
$$BR\{(1-BP)\cos^2\theta + (1+BP)\sin^2\theta\}^3 R^6 +$$
$$CR\{(1-CP)\cos^2\theta + (1+CP)\sin^2\theta\}^4 R^8 +$$
$$DR\{(1-DP)\cos^2\theta + (1+DP)\sin^2\theta\}^5 R^{10}$$

This eq. (5) is a basic formula for expressing ordinary aspheres in a cross section parallel to the direction of R.

As will be understood from eq. (2), the lens surface S1 is such that R1M, or the paraaxial radius of curvature in the deflecting plane, is positive (the distance as measured in the direction in which the incident laser beam is launched or coming on is taken to be "positive" and the distance as measured in the direction in which the incident laser beam travels on is taken to be "negative" ); therefore, taken in the deflecting plane, S1 is convex toward the polygonal mirror 18. As will be understood from eq. .(3), R1S, or the paraaxial radius of curvature in the plane orthogonal to the deflecting plane is negative; therefore, taken in the plane orthogonal to the deflecting plane, S1 is concave toward the polygonal mirror 18, or convex toward the photoreceptor drum 26. In short, surface S1 provides an anamorphic aspheric shape.

Figure 3:
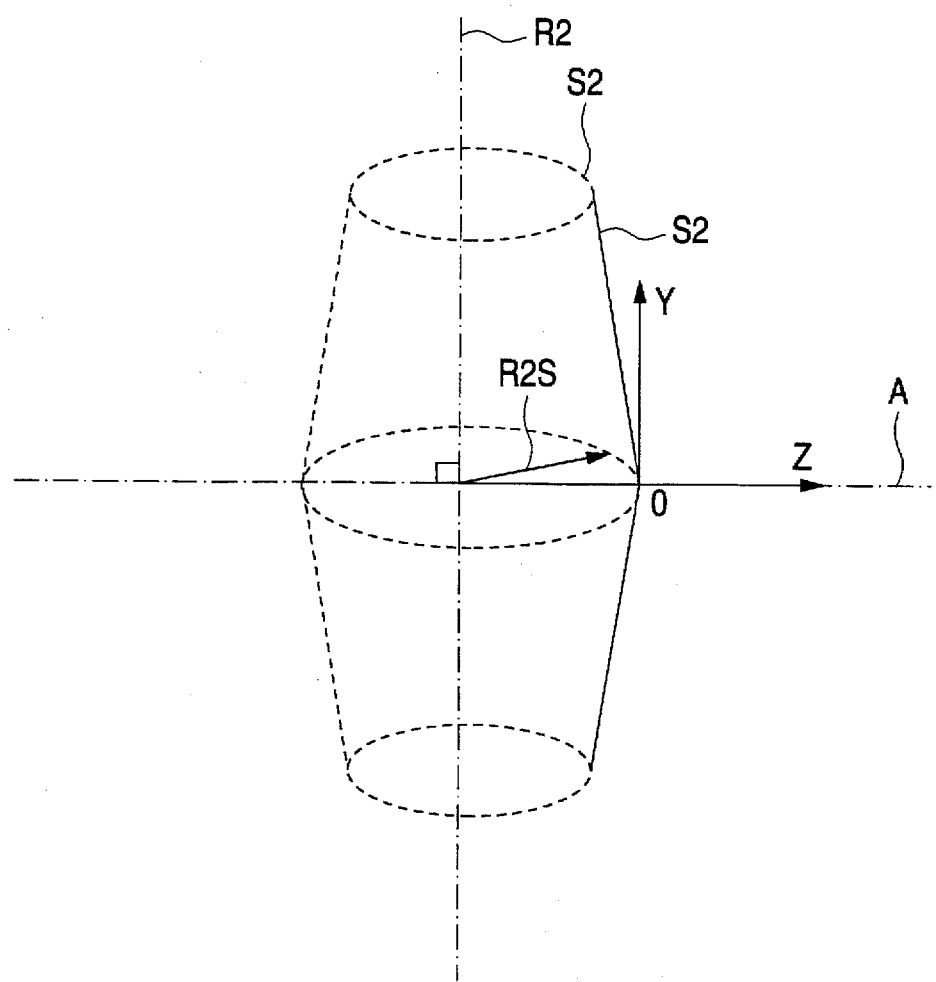
FIG. 3 illustrates how the fθ lens of Example 1 looks like on the surface adjacent the surface to be scanned.

The aspheric lens surface S2 is such that when a YZ plane having the origin at the point of intersection between the optical axis A and the lens surface S2, with the Z axis coinciding with the optical axis, is assumed in the deflecting plane as shown in FIG. 3, position Z in a plane parallel to the optical axis is obtained by causing a curve expressed by the following equation (6) to rotate about a line parallel to the Y axis and distant from the origin by R2S:

$$Z = \frac{(1/R2M) Y^2}{1 + Sqrt\{1 - (1 + K)(1/R2M)^2 Y^2\}} + AY^4 + BY^6 + CY^8 + DY^{10} \quad (6)$$

where K is the conic constant; and A, B, C and D are higher-order aspheric coefficients.

Lens surface S2, when taken in the deflecting plane, is an asphere that is convex toward the photoreceptor drum 26, or concave toward the polygonal mirror 18; when taken in the plane orthogonal to the deflecting plane, S2 is a circle that is convex toward the photoreceptor drum 26, or concave toward the polygonal mirror 18.

In order to use only one fθ lens element as in Example 1 and yet ensure balance between the fθ and imaging characteristics without undue increase in the center thickness, it is preferred that radii of curvature R1M and R2S are approximate to the focal length f. In other words, the fθ lens is preferably designed to satisfy the following conditions:

0.598<R1M/f<1.475

−0.128<R2S/f<−0.104

Table 1 given below shows the dimensions of various parts of the fθ lens 22 according to Example 1 that was fabricated from an amorphous polyolefin, as well as the values of R1M/f and R2S/f. In Table 1, n signifies the refractive index of the amorphous polyolefin; $d_1$, the axial space between lens surfaces S1 and S2; $d_0$, the axial distance from reflecting face 20 of polygonal mirror 18 to lens surface S1 of fθ lens 22 on the side adjacent polygonal mirror 18; $d_2$ is the distance from lens surface S2 of fθ lens 22 on the side adjacent photoreceptor drum 26 to the surface of the drum (for $d_0$, $d_1$ and $d_2$, see FIG. 1a); f, the focal length of fθ lens 22 in the deflecting plane; θ, maximum viewing angle; λ, the wavelength of the laser beam. The dimensions of various parts of the fθ lens 22 are expressed in millimeters, except for conic constants KX, KY and K, aspheric coefficients AR, BR, CR, DR, AP, BP, CP, DP, A, B, C and D, refractive index n, maximum viewing angle θ, and wavelength λ. To take an exemplary exponential expression, −0.9094e-5 shall mean $-0.9094 \times 10^{-5}$.

The distance from the center of rotation of the polygonal mirror 18 to the reflecting face 20 is 17 mm and the incident light on the polygonal mirror 18 is launched in the axial direction. This assumption is made to provide simplicity in the explanation of the examples of the invention and substantially identical results will be attained if the incident light is launched at angles with the optical axis. The beam of incident light is convergent near the reflecting face 20 in the plane orthogonal to the deflecting plane but parallel in the deflecting plane.

Figure 6:
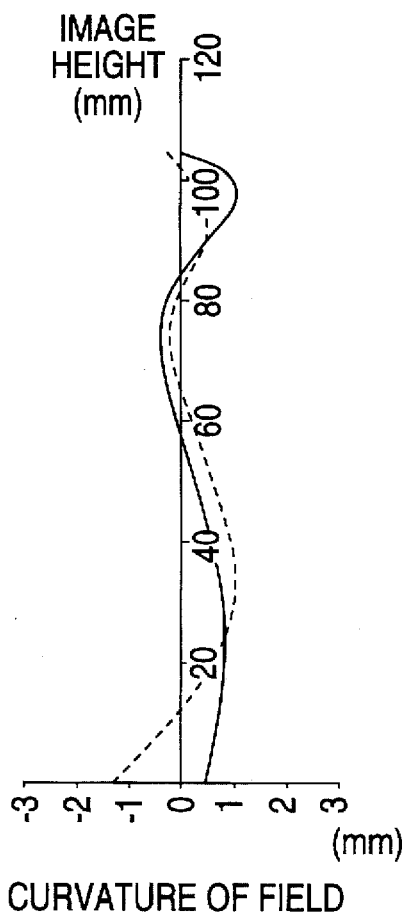
FIG. 6a is a graph plotting the field curvature of the fθ lens of Example 1.
FIG. 6b is a graph plotting the fθ characteristic of the fθ lens of Example 1.
Figure 6:
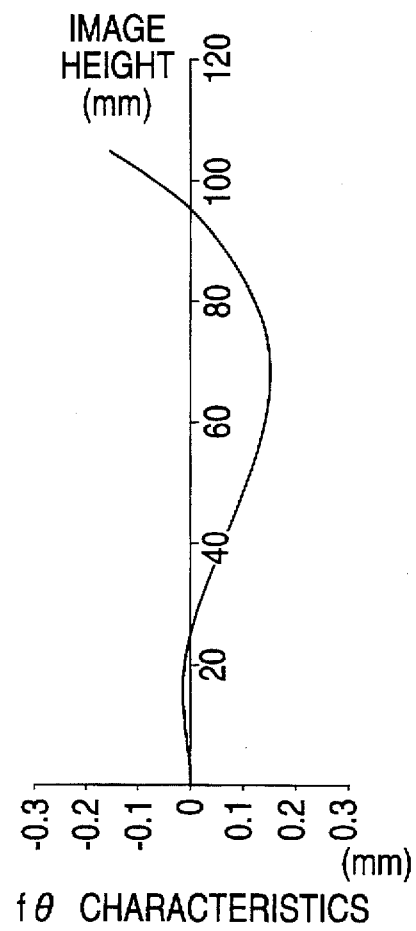
Figure 7:
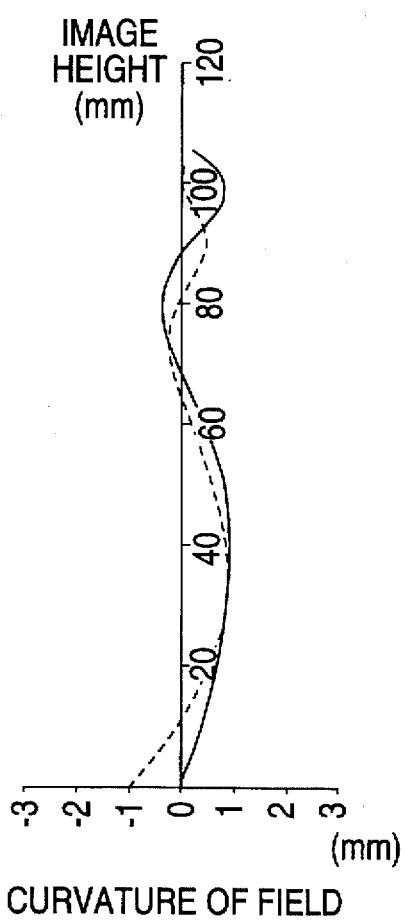
FIG. 7a is a graph plotting the field curvature of the fθ lens of Example 2.
FIG. 7b is a graph plotting the fθ characteristic of the fθ lens of Example 2.
Figure 7:
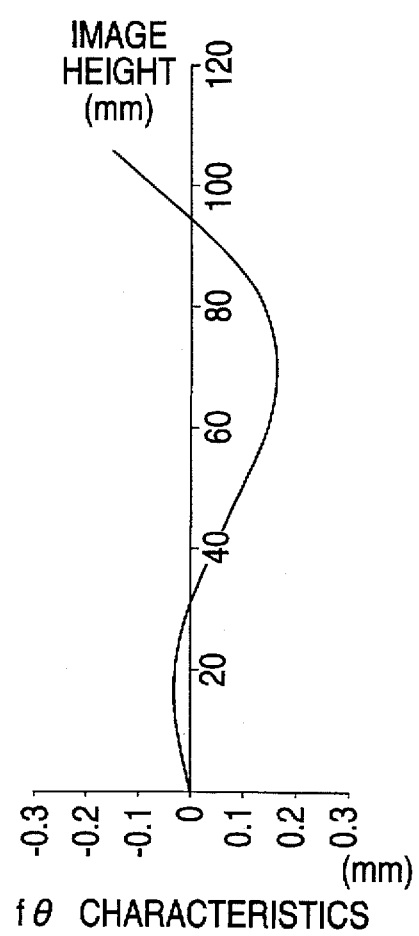
Figure 8:
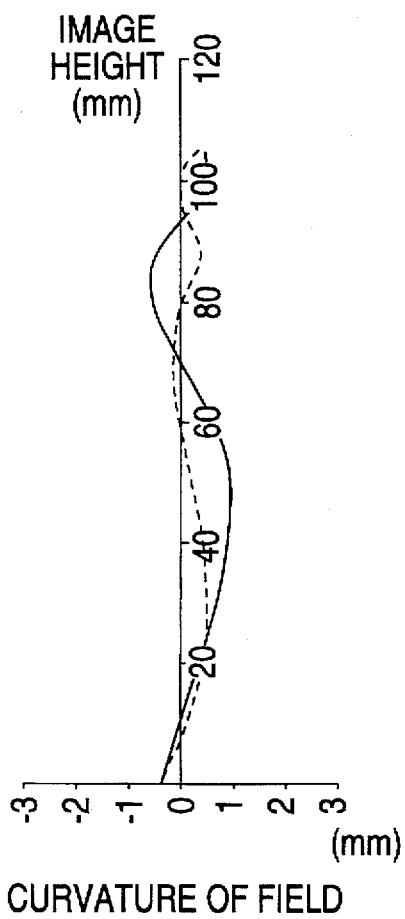
FIG. 8a is a graph plotting the field curvature of the fθ lens of Example 3.
FIG. 8b is a graph plotting the fθ characteristic of the fθ lens of Example 3.
Figure 8:
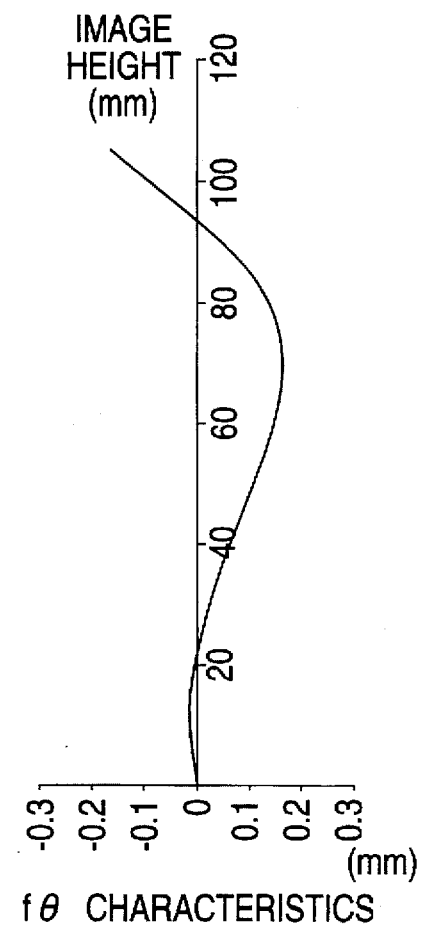
Figure 9:
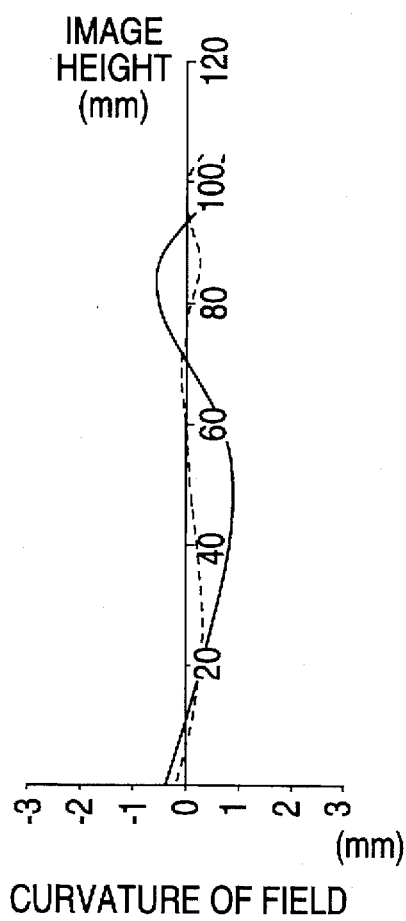
FIG. 9a is a graph plotting the field curvature of the fθ lens of Example 4.
FIG. 9b is a graph plotting the fθ characteristic of the fθ lens of Example 4.
Figure 9:
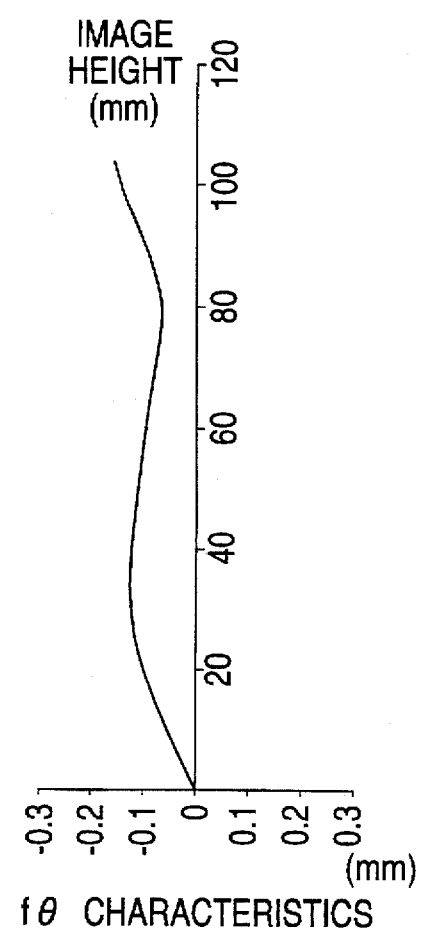
Figure 10:
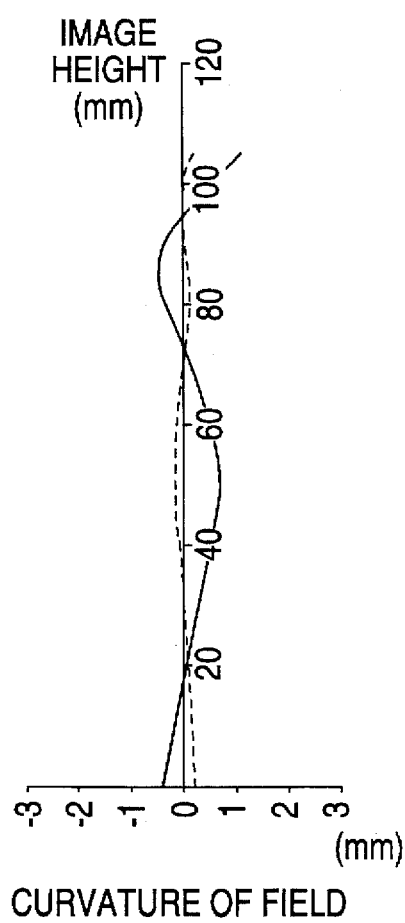
FIG. 10a is a graph plotting the field curvature of the fθ lens of Example 5.
FIG. 10b is a graph plotting the fθ characteristic of the fθ lens of Example 5.
Figure 10:
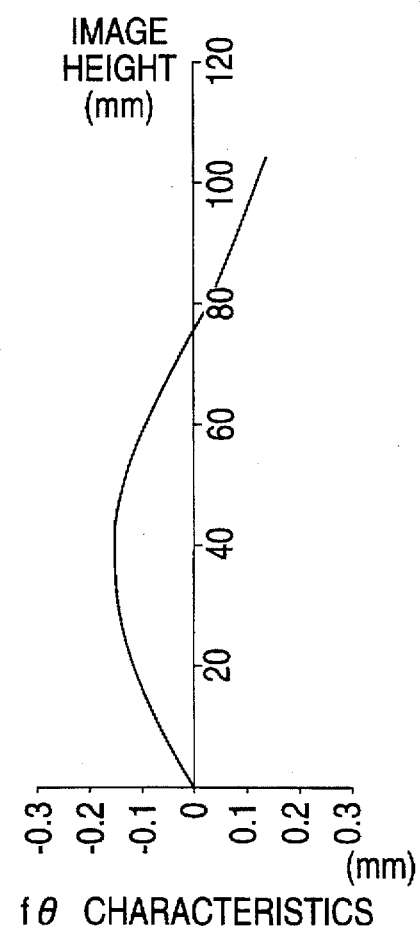
Figure 11:
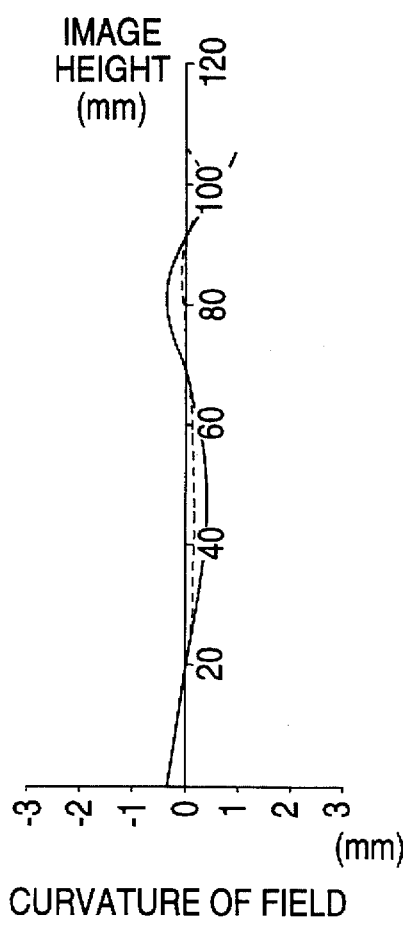
FIG. 11a is a graph plotting the field curvature of the fθ lens of Example 6.
FIG. 11b is a graph plotting the fθ characteristic of the fθ lens of Example 6.
Figure 11:
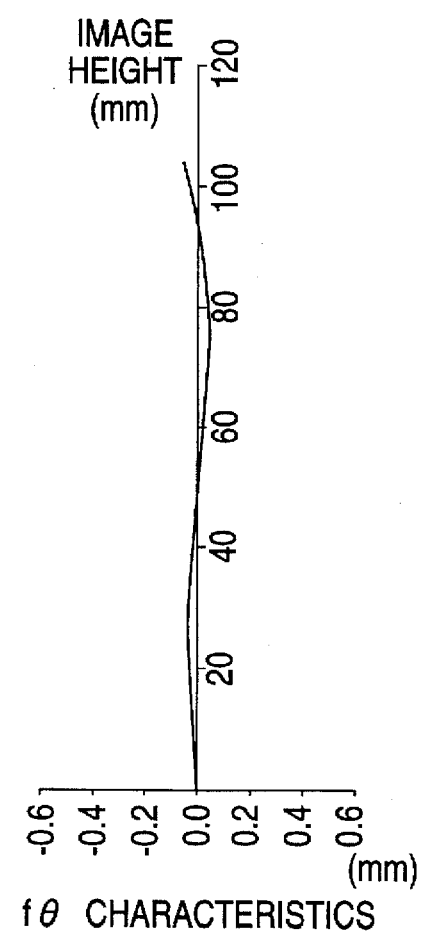
Figure 12:
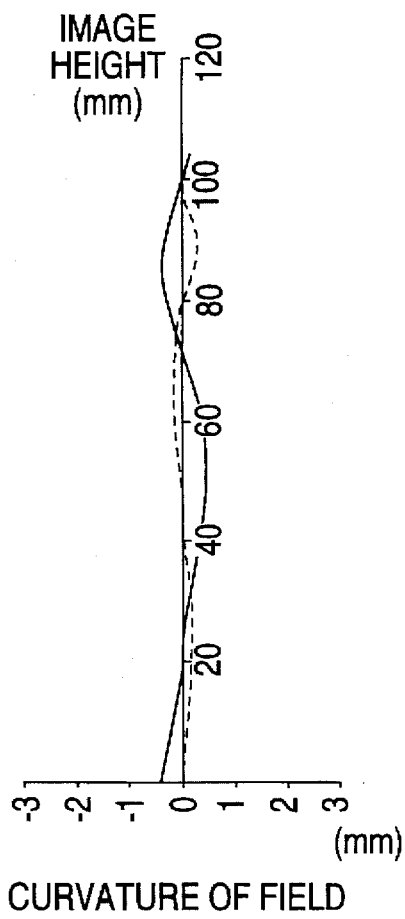
FIG. 12a is a graph plotting the field curvature of the fθ lens of Example 7.
FIG. 12b is a graph plotting the fθ characteristic of the fθ lens of Example 7.
Figure 12:
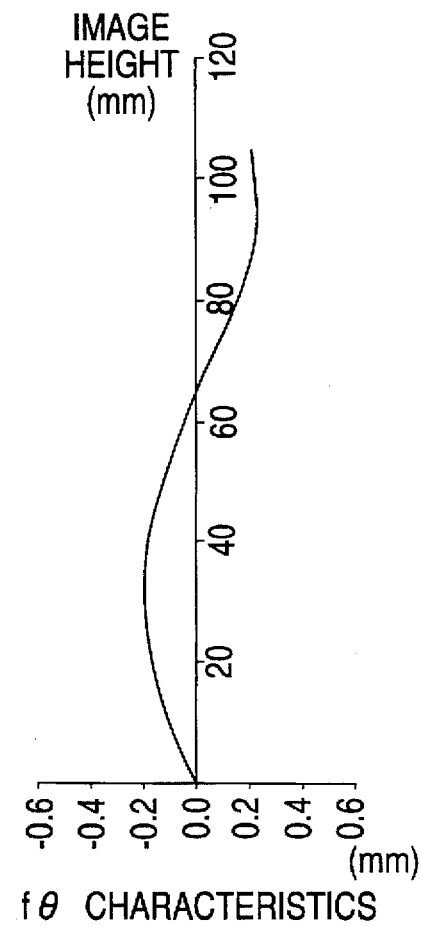
Figure 13:
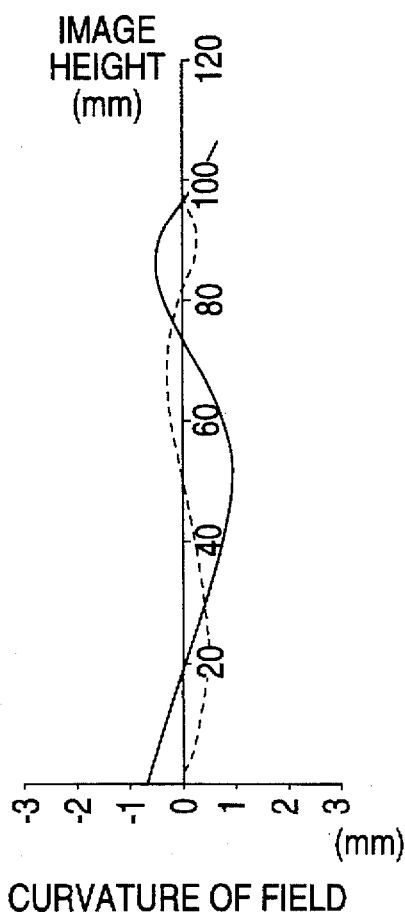
FIG. 13a is a graph plotting the field curvature of the fθ lens of Example 8.
FIG. 13b is a graph plotting the fθ characteristic of the fθ lens of Example 8.
Figure 13:
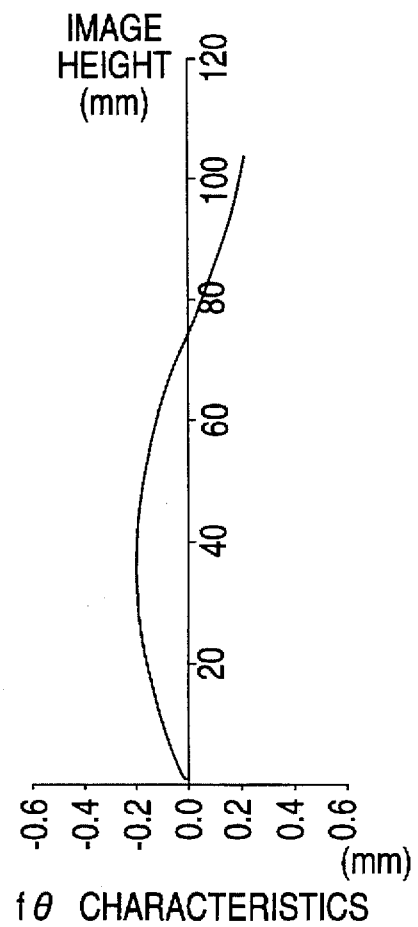

The fθ lens formulated in Table 1 has curvature of the field as plotted in FIG. 6a; its fθ characteristic is plotted in FIG. 6b in terms of the departure from the ideal position. The dashed line in FIG. 6a plots the curvature of the field in the main scanning direction and the solid line plots the curvature of the field in the sub-scanning direction.

Tables 2–8 show the dimensions of various parts of the fθ lenses according to Examples 2–8, respectively, which are employed in the same optical scanner as shown in FIG. 4, as well as the values of R1M/f and R2S/f. FIGS. 7a and 7b to FIGS. 13a and 13b are graphs plotting the curvatures of the field and fθ characteristics of the fθ lenses formulated in Tables 2–8, respectively.

As the fθ lens of Example 1, those of Examples 2–5 used an amorphous polyolefin as an optical plastic material, with the radius of curvature R1M being varied as a parameter. The ideal focal length serving as a reference for the fθ characteristic was 143.2394488 mm. Examples 1–5 provide designs in which R1M was varied progressively at 85, 105, 135, 160 and 210 mm. Accordingly, the radius of curvature R2S varied progressively at −14.8883, −15.5992, −16.7585, −16.9093 and −17.4844. When normalized with the focal length f, R1M and R2S obviously satisfied the following conditions in Examples 1–5;

0.598<R1M/f<1.475

−0.128<R2S/f<−0.104

Example 6 provides a design in which the center thickness of the fθ lens was made greater than in Examples 1–5; obviously, the two conditions set forth above were satisfied.

Examples 7 and 8 provide designs in which the beam of incident light was made generally parallel. The degree of convergence of the incident beam is indicated by the numerals preceded by OBJ in Tables 7 and 8. In Example 7, the incident light was convergent at a point that was away from the reflecting face 20 of polygonal mirror 18 toward the fθ lens by a distance of 1301.33 mm. In Example 8, the incident light was convergent at a point that was away from the reflecting face 20 of polygonal mirror 18 toward the fθ lens by a distance of 3268.43 mm. Obviously, the two conditions at issue were satisfied in both Examples 7 and 8.

The fθ lenses of Examples 1–8 were cut through the deflecting plane and the resulting cross sections are shown in FIGS. 5(a)–5(h).

As one can see from FIGS. 7a and 7b to FIGS. 13a and 13b, curvature of the field was effectively corrected in the fθ lenses of Examples 2–8. It should also be noted that the departure from the ideal position as a measure for the fθ characteristic was less than about 0.2 mm in each of Examples 2–8, demonstrating that satisfactory results were obtained.

TABLE 1

| | |
|---|---|
| f = 141.908  θ = 42°  λ = 785 nm  n = 1.519139 | |
| R1M = 85   R1S = −1511.2   d0 = 29.5819   d1 = 10 | |
| KY = −29.2966 | KX = −36886.8 |
| AR = −0.909483e-5 | AP = −0.61952 |
| BR = 1.576860e-10 | BP = 0.242927 |
| CR = −1.340449e-9 | CP = −1.04 |
| DR = −1.775172e-17 | DP = −0.977536 |
| R2M = −530.474   R2S = −14.8883   d2 = 137.593 | |
| K = 87.8426 | |
| A = −0.313320e-5 | |
| B = 1.501854e-9 | |
| C = −8.419649e-13 | |
| D = 2.121955e-16 | |
| R1M/f = 0.5989   R2S/f = −0.1049 | |

TABLE 2

| | |
|---|---|
| f = 142.086   θ = 42°   λ = 785 nm   n = 1.519139 | |
| R1M = 105   R1S = −1635.03 | |
| d0 = 31.7728 | d1 = 10 |
| KY = −35.6949 | KX = −48180.1 |
| AR = −0.107262e-4 | AP = −0.757251 |
| BR = −4.071718e-11 | BP = 0.902483 |

TABLE 2-continued

| | |
|---|---|
| CR = −2.001258e-10 | CP = −1.04029 |
| DR = −1.775172e-17 | DP = −0.977536 |
| R2M = −239.872   R2S = −15.5992   d2 = 138.52 | |
| K = 14.304 | |
| A = −0.1653e-5 | |
| B = 3.321373e-10 | |
| C = −2.400104e-13 | |
| D = −7.395970e-17 | |
| R1M/f = 0.7389   R2S/f = −0.1097 | |

TABLE 3

| | |
|---|---|
| f = 142.76   θ = 42°   λ = 785 nm   n = 1.519139 | |
| R1M = 135   R1S = −1632.93 | |
| d0 = 35.5114 | d1 = 10 |
| KY = −43.8768 | KX = −46712.1 |
| AR = −0.151934e-4 | AP = −0.866582 |
| BR = −3.430736e-11 | BP = 0.727522 |
| CR = 1.026158e-11 | CP = −1.13725 |
| DR = −1.775172e-17 | DP = −0.977536 |
| R2M = −160.163   R2S = −16.7585   d2 = 139.599 | |
| K = 2.2757 | |
| A = −0.909397e-6 | |
| B = 1.230951e-10 | |
| C = −1.071974e-13 | |
| D = −3.660726e-17 | |
| R1M/f = 0.9456   R2S/f = −0.1173 | |

TABLE 4

| | |
|---|---|
| f = 142.279   θ = 42° λ = 785 nm   n = 1.519139 | |
| R1M = 160   R1S = −1596.07 | |
| d0 = 36.044 | d1 = 10 |
| KY = −56.2459 | KX = −49316.9 |
| AR = −0.163338e-4 | AP = −0.865254 |
| BR = −2.913672e-11 | BP = 0.645518 |
| CR = 1.379688e-11 | CP = −1.15072 |
| DR = −1.775172e-17 | DP = −0.977536 |
| R2M = −134.27   R2S = −16.9093   d2 = 139.436 | |
| K = 1.28843 | |
| A = −0.739220e-6 | |
| B = 7.796818e-11 | |
| C = −9.932522e-14 | |
| D = −2.096697e-17 | |
| R1M/f = 1.1245   R2S/f = −0.1188 | |

TABLE 5

| | |
|---|---|
| f = 142.42   θ = 42°   λ = 785 nm   n = 1.519139 | |
| R1M = 210   R1S = −1557.28 | |
| d0 = 37.9511 | d1 = 10 |
| KY = −70.9272 | KX = −52336.4 |
| AR = −0.162639e-4 | AP = −0.872811 |
| BR = −1.880175e-11 | BP = 0.440916 |
| CR = 1.471565e-11 | CP = −1.16363 |
| DR = −1.775172e-17 | DP = −0.977536 |
| R2M = −112.255   R2S = −17.4844   d2 = 139.949 | |
| K = −0.246558 | |
| A = −0.512030e-6 | |
| B = 3.155340e-11 | |
| C = −8.710767e-14 | |
| D = 7.447563e-18 | |
| R1M/f = 1.47451   R2S/f = −0.1227 | |

TABLE 6

| | |
|---|---|
| f = 142.803   θ = 42° λ = 785 nm n = 1.519139 | |
| R1M = 208.617   R1S = −1572.38 | |
| d0 = 38.0522 | d1 = 14 |
| KY = −74.8707 | KX = −49604.5 |

TABLE 6-continued

```
AR = -0.198754e-4      AP = -0.866806
BR = -1.972725e-12     BP = -0.05763
CR = 1.381908e-11      CP = -1.19253
DR = -1.775172e-17     DP = -0.977536
R2M = -112.365   R2S = -18.2827   d2 = 139.631
K = -0.511844
A = -0.579343e-6
B = 2.177109e-11
C = -6.230545e-14
D = 1.856493e-17
R1M/f = 1.4608    R2S/f = -0.1280
```

TABLE 7

```
f = 155.387   θ = 42°  λ = 785 nm      n = 1.519139
                                       OBJ = -1301.33
R1M = 162.851    R1S = -335.056
  d0 = 36.4434      d1 = 9.65663
  KY = -42.0852     KX = -2208.41
  AR = -0.179569e-4    AP = -0.929814
  BR = -3.572071e-11   BP = 0.616369
  CR = -5.767452e-13   CP = -0.647933
  DR = -1.775172e-17   DP = -0.977536
R2M = -156.608   R2S = -17.1725   d2 = 134.132
K = -8.90965
A = -0.653622e-6
B = -4.423474e-11
C = -1.936905e-14
D = -3.926459e-17
R1M/f = 1.0480    R2S/f = -0.1105
```

TABLE 8

```
f = 146.733   θ = 42°  λ = 785 nm      n = 1.519139
                                       OBJ = -3268.43
R1M = 181.097    R1S = -380.865
  d0 = 35.639       d1 = 10.461
  KY = -73.1673     KX = -3227.72
  AR = -0.208489e-4    AP = -0.8844
  BR = -2.39969e-09    BP = -1.11019
  CR = -9.741431e-14   CP = -0.159761
  DR = -1.775165e-17   DP = -0.977537
R2M = -128.883   R2S = -16.78   d2 = 137.306
K = 5.02795
A = -4.077485e-7
B = 1.460861e-10
C = -3.653439e-15
D = -4.816441e-17
R1M/f = 1.2342    R2S/f = -0.1143
```

As described above, the fθ lens of the invention adopts an aspheric shape in the deflecting plane and hence provides good imaging performance in terms of fθ characteristic and curvature of the field. The asphere offers the added advantage of insuring smooth continuity and reducing wavefront aberrations to minimum levels. What is more, the principal radii of curvature of the two surfaces of the fθ lens are made to be substantially the same and their powers are sufficiently distributed to reduce the center thickness of the lens while assuring uniformity in f-number.

The foregoing description of the invention concerns the case where the fθ lens is formed of an amorphous polyolefin as a plastic material; it should however be noted that the lens may be formed of other plastic materials such as acrylic resins and polycarbonates or it may even be formed of glass.

The advantages of the invention are two-fold. First, the use of simple aspheric shapes on lens surfaces enables the provision of a single-element scanning lens that has high performance and which yet is easy to design and manufacture. Second, the use of a single-element scanning lens that has high performance and which yet is easy to design and manufacture on account of simple aspheric lens shapes contributes to the production of a compact optical scanner at low cost.

What is claimed is:

1. A single-element scanning lens which is located between deflecting means for deflecting a beam of incident light in a specified direction at uniform angular velocity and a surface to be scanned and which allows the beam of incident light to be focused on the surface to be scanned such as to produce a light spot that scans at uniform speed, said scanning lens comprising in order from the deflecting means side:

a first lens surface such that the geometry in a deflecting plane that is formed by the principal rays of the light beam deflected by said deflecting means is aspheric and paraaxially convex toward the deflector and that the geometry in a plane orthogonal to said deflecting plane and including the optical axis is aspheric and paraaxially concave toward the deflector; and a second lens surface that has an axis of rotation located in said deflecting plane and orthogonal to the optical axis of the scanning lens and which is such that curves formed by intersection with said deflecting plane provide an aspheric shape that is paraaxially convex toward the surface to be scanned whereas curves formed by intersection with the plane orthogonal to said deflecting plane provide a circular shape that is convex toward the surface to be scanned, said first and second lens surfaces satisfying the following relationships:

$$0.598 < R1M/f < 1.475$$
$$-0.128 < R2S/f < -0.104$$

where R1M is the paraaxial radius of curvature of said first lens surface in the deflecting plane, R1S is the paraaxial radius of curvature of said first lens surface in the plane orthogonal to the deflecting plane, R2M is the paraaxial radius of curvature of said second lens surface in the deflecting plane, R2S is the paraaxial radius of curvature of said second lens surface in the plane orthogonal to the deflecting plane, f is the focal length of the scanning lens in the deflecting plane, and the minus sign means that the lens surface of interest is convex on the side where the incident beam travels on rather than it is launched.

2. A scanning lens according to claim 1, wherein said first lens surface is such a curved surface that when a YZ plane having the origin at the point of intersection between the optical axis and the first lens surface, with the Z axis coinciding with the optical axis, is assumed in the deflecting plane and when the X axis is assumed in the plane orthogonal to the deflecting plane, position Z in a plane parallel to the optical axis is expressed by the following equation I, and wherein said second lens surface is such that when a YZ plane having the origin at the point of intersection between the optical axis and the second lens surface, with the Z axis coinciding with the optical axis, is assumed in the deflecting plane, position Z in a plane parallel to the optical axis is obtained by causing a curve expressed by the following equation II to rotate about a line parallel to the Y axis and distant from the origin by R2S:

$$Z = \frac{(1/R1S) X^2 + (1/R1M) Y^2}{1 + Sqrt\{1 - (1 + KX)(1/R1S)^2 X^2 - (1 + KY)(1/R1M)^2 Y^2\}} + \quad \text{I.}$$

$$AR \{(1 - AP) X^2 + (1 + AP) Y^2\}^2 + BR \{(1 - BP) X^2 + (1 + BP) Y^2\}^3 +$$

$$CR\{(1-CP)X^2+(1+CP)Y^2\}^4 + DR\{(1-DP)X^2+(1+DP)Y^2\}^5$$

where KX is the conic constant of the asphere in the plane orthogonal to the, deflecting plane and including the optical axis; KY is the conic constant of the asphere in the deflecting plane including the optical axis; AR, BR, CR, DR, AP, BP, CP and DP are higher-order aspheric coefficients; and $$Z = \frac{(1/R2M)Y^2}{1+Sqrt\{1-(1+K)(1/R2M)^2Y^2\}} + AY^4 + BY^6 + CY^8 + DY^{10} \qquad \text{II.}$$

where K is the conic constant; and A, B, C and D are higher-order aspheric coefficients.

3. An optical scanner comprising:
a light source;
collimating means for transforming a beam of the light from said source into a generally parallel beam;
imaging means by which said generally parallel beam is focused as a line image elongated in a direction parallel to the main scanning direction;
deflecting means that has a reflecting face at or near the focus position of said line image and which deflects the beam of incident light at uniform angular velocity in a direction parallel to the main scanning direction; and
a single-element scanning lens located between said deflecting means and a surface to be scanned and characterized in that the lens surface adjacent said deflecting means is aspheric such that the geometry in a deflecting plane that is formed by the principal rays of the light beam deflected by said deflecting means is aspheric and paraaxially convex toward the deflector and that the geometry in a plane orthogonal to said deflecting plane and including the optical axis is aspheric and paraaxially concave toward the deflector, wherein the lens surface adjacent said surface to be scanned has an axis of rotation located in said deflecting plane and orthogonal to the optical axis of the scanning lens and is such that curves formed by intersection with said deflecting plane provide an aspheric shape that is convex paraaxially toward the surface to be scanned whereas curves formed by intersection with the plane orthogonal to said deflecting plane provide a circular shape that is convex toward the surface to be scanned, and wherein said scanning lens allows the beam of incident light to be focused on the surface to be scanned such as to produce a light spot that scans at uniform speed.

4. An optical scanner according to claim 3, wherein the lens surface adjacent said deflecting means is such a curved surface that when a YZ plane having the origin at the point of intersection between the optical axis and the first lens surface, with the Z axis coinciding with the optical axis, is assumed in the deflecting plane and when the X axis is assumed in the plane orthogonal to the deflecting plane, position Z in a plane parallel to the optical axis is expressed by the following equation I, and wherein the lens surface adjacent said surface to be scanned is such that when a YZ plane having the origin at the point of intersection between the optical axis and the second lens surface, with the Z axis coinciding with the optical axis, is assumed in the deflecting plane, position Z in a plane parallel to the optical axis is obtained by causing a curve expressed by the following equation II to rotate about a line parallel to the Y axis and distant from the origin by R2S:

$$Z = \frac{(1/R1S)X^2+(1/R1M)Y^2}{1+Sqrt\{1-(1+KX)(1/R1S)^2X^2-(1+KY)(1/R1M)^2Y^2\}} + \qquad \text{I.}$$

$$AR\{(1-AP)X^2+(1+AP)Y^2\}^2 + BR\{(1-BP)X^2+(1+BP)Y^2\}^3 +$$

$$CR\{(1-CP)X^2+(1+CP)Y^2\}^4 + DR\{(1-DP)X^2+(1+DP)Y^2\}^5$$

where KX is the conic constant of the asphere in the plane orthogonal to the deflecting plane and including the optical axis; KY is the conic constant of the asphere in the deflecting plane including the optical axis; AR, BR, CR, DR, AP, BP, CP and DP are higher-order aspheric coefficients; and $$Z = \frac{(1/R2M)Y^2}{1+Sqrt\{1-(1+K)(1/R2M)^2Y^2\}} + AY^4 + BY^6 + CY^8 + DY^{10} \qquad \text{II.}$$

where K is the conic constant; and A, B, C and D are higher-order aspheric coefficients.

5. An optical scanner according to claim 4, wherein said scanning lens is so formed that said first and second lens surfaces satisfy the following relationships:

0.598<R1M/f<1.475

−0.128<R2S/f<−0.104 where R1M is the paraaxial radius of curvature of said first lens surface in the deflecting plane, R1S is the paraaxial radius of curvature of said first lens surface in the plane orthogonal to the deflecting plane, R2M is the paraaxial radius of curvature of said second lens surface in the deflecting plane, R2S is the paraaxial radius of curvature of said second lens surface in the plane orthogonal to the deflecting plane, f is the focal length of the scanning lens in the deflecting plane, and the minus sign means that the lens surface of interest is convex on the side where the incident beam travels on rather than it is launched.

* * * * *

UNITED STATES PATENT AND TRADEMARK OFFICE
CERTIFICATE OF CORRECTION

PATENT NO. : 5,710,654
DATED : January 20, 1998
INVENTOR(S) : Akira OTA

It is certified that error appears in the above-identified patent and that said Letters Patent is hereby corrected as shown below:

Claim 2, column 13, line 5, after "the", delete ",".

Claim 2, column 13, line 7, "BF" should read --BP--.

Signed and Sealed this

Eighteenth Day of May, 1999

Attest:

Q. TODD DICKINSON

Attesting Officer

Acting Commissioner of Patents and Trademarks